US011138889B2

(12) United States Patent
Johnson et al.

(10) Patent No.: US 11,138,889 B2
(45) Date of Patent: Oct. 5, 2021

(54) UNMANNED AERIAL VEHICLE AIRSPACE RESERVATION AND ALLOCATION SYSTEM

(71) Applicant: Skydio, Inc., Redwood, CA (US)

(72) Inventors: Eric David Johnson, Walnut Creek, CA (US); Jesse Daniel Kallman, San Francisco, CA (US); Bernard J. Michini, San Francisco, CA (US)

(73) Assignee: Skydio, Inc., Redwood City, CA (US)

( * ) Notice: Subject to any disclaimer, the term of this patent is extended or adjusted under 35 U.S.C. 154(b) by 424 days.

(21) Appl. No.: 15/466,367

(22) Filed: Mar. 22, 2017

(65) Prior Publication Data

US 2017/0278409 A1    Sep. 28, 2017

Related U.S. Application Data

(60) Provisional application No. 62/313,661, filed on Mar. 25, 2016.

(51) Int. Cl.
*G08G 5/00* (2006.01)
*G06Q 10/02* (2012.01)
*B64C 39/02* (2006.01)

(52) U.S. Cl.
CPC ......... *G08G 5/0069* (2013.01); *B64C 39/024* (2013.01); *G06Q 10/02* (2013.01); *G08G 5/0013* (2013.01); *G08G 5/0026* (2013.01); *G08G 5/0034* (2013.01); *G08G 5/0086* (2013.01); *B64C 2201/12* (2013.01)

(58) Field of Classification Search
None
See application file for complete search history.

(56) References Cited

U.S. PATENT DOCUMENTS 5,761,629 A * 6/1998 Gilling .................. G01S 13/931
701/96
9,959,771 B1 * 5/2018 Carlson ................ G08G 5/0039

* cited by examiner

*Primary Examiner* — Thomas G Black
*Assistant Examiner* — Ana D Thomas
(74) *Attorney, Agent, or Firm* — Young Basile Hanlon & MacFarlane, P.C.

(57) ABSTRACT

Methods, systems, and apparatus, including computer programs encoded on computer storage media, for reserving airspace for UAV operations. In some implementations, a flight planning system can reserve and allocate airspace for unmanned aerial vehicle (UAV) operations. For example, a UAV operator device can submit a flight plan to the flight planning system. The flight planning system can submit a flight authorization request to an airspace management system to reserve airspace necessary for the flight plan. The flight planning system can receive approval and/or a reservation of the airspace for the flight plan from the airspace management system, generate a flight data package, and send the flight data package to the operator's device.

27 Claims, 8 Drawing Sheets

UNMANNED AERIAL VEHICLE AIRSPACE RESERVATION AND ALLOCATION SYSTEM

RELATED APPLICATION

This application claims the benefit U.S. Provisional Application No. 62/313,661, filed on Mar. 25, 2016, and which is incorporated herein by reference.

BACKGROUND

Given the increasing use of unmanned aerial vehicles (UAVs) in populated areas, and around various structures, a flight planning system is needed to efficiently reserve airspace for safe UAV operations.

SUMMARY

In some implementations, a flight planning system can reserve and allocate airspace for unmanned aerial vehicle (UAV) operations for flight plans obtained or generated by the flight planning system. The flight planning system can submit a flight authorization request to a separate airspace management system, or an airspace management module that is functionally part of the flight planning system, to reserve airspace necessary for the flight plan. The flight planning system can receive approval and/or a reservation of the airspace for the flight plan from the airspace management system, generate a flight data package, and send the flight data package to a device, such a ground control system, or send the flight data package directly to the UAV that will be conducting the flight plan.

In some implementations, the flight planning system can aggregate requests for multiple flight plans for various UAVs. For example, multiple flight plans for different UAVs may be created by, or obtained by, the flight planning system. The flight planning system can combine the flight plans and submit a combined flight authorization request to an airspace management system to reserve airspace necessary for the flight plans. The flight planning system can receive approval and/or a reservation of the airspace for the flight plans from the airspace management system, allocate the airspace reservations for different UAV operations, generate a flight data package for each UAV based on the allocated airspace, and send the flight data packages to the ground control system (i.e., operator device), or directly to the UAV that will be conducting the flight plan.

In some implementations, the flight planning system can generate flight authorization requests based on available airspace. For example, the flight planning system can request and receive from an airspace management system information describing available airspace in an area. A user device, such as a ground control system, or other computer system, may submit a flight plan to the flight planning system. The flight planning system can adjust the flight plan based on the available airspace and generate a flight authorization request based on the adjusted flight plan. The flight planning system can submit the flight authorization request to an airspace management system to reserve airspace necessary for the flight plan. The flight planning system can receive approval and/or a reservation of the airspace for the flight plan from the airspace management system, generate a flight data package, and send the flight data package a ground control system (i.e., operator device), or directly to the UAV that will be conducting the flight plan.

In some implementations, the flight planning system can predictively reserve airspace for UAV operations. For example, the flight planning system can be configured to receive information related to weather, natural disasters, accidents, and/or other events from various network services. These events may be good predictors of subsequent airspace reservation requests for UAV operations. For example, UAV operations may be needed over house after a hail-storm to inspect rooftop damage caused by the hail. In response to receiving event data that are predictive of future airspace requests, the flight planning system can generate and submit a flight authorization request to an airspace management system to reserve airspace necessary for predicted future inspection missions. The flight planning system can receive approval and/or a reservation of the airspace for the flight plans from the airspace management system. When the flight planning system later receives a request for airspace for a UAV operation, the flight planning system can allocate the previously reserved airspace reservations for the prior UAV operations, generate a flight data package for each UAV operation based on the allocated airspace, and send the flight data packages to the operator's devices, or directly to the UAV conducting the flight plan.

While a user device is generally described as the system for creating a flight plan, and submitting a flight authorization request, other systems can be used to create a flight plan, and submit a flight authorization request, and then provide the approved flight plan to the user device, or directly to a UAV that will be conducting the flight plan.

Implementations described herein provide at least the following advantages: airspace can be quickly and easily reserved for UAV operations; a central system can coordinate reservation requests to reduce bandwidth and processing requirements, airspace can be intelligently requested based on available airspace to reduce the need for subsequent airspace request, airspace can be predictively requested based on event data in anticipation of the airspace needs for UAV operations.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
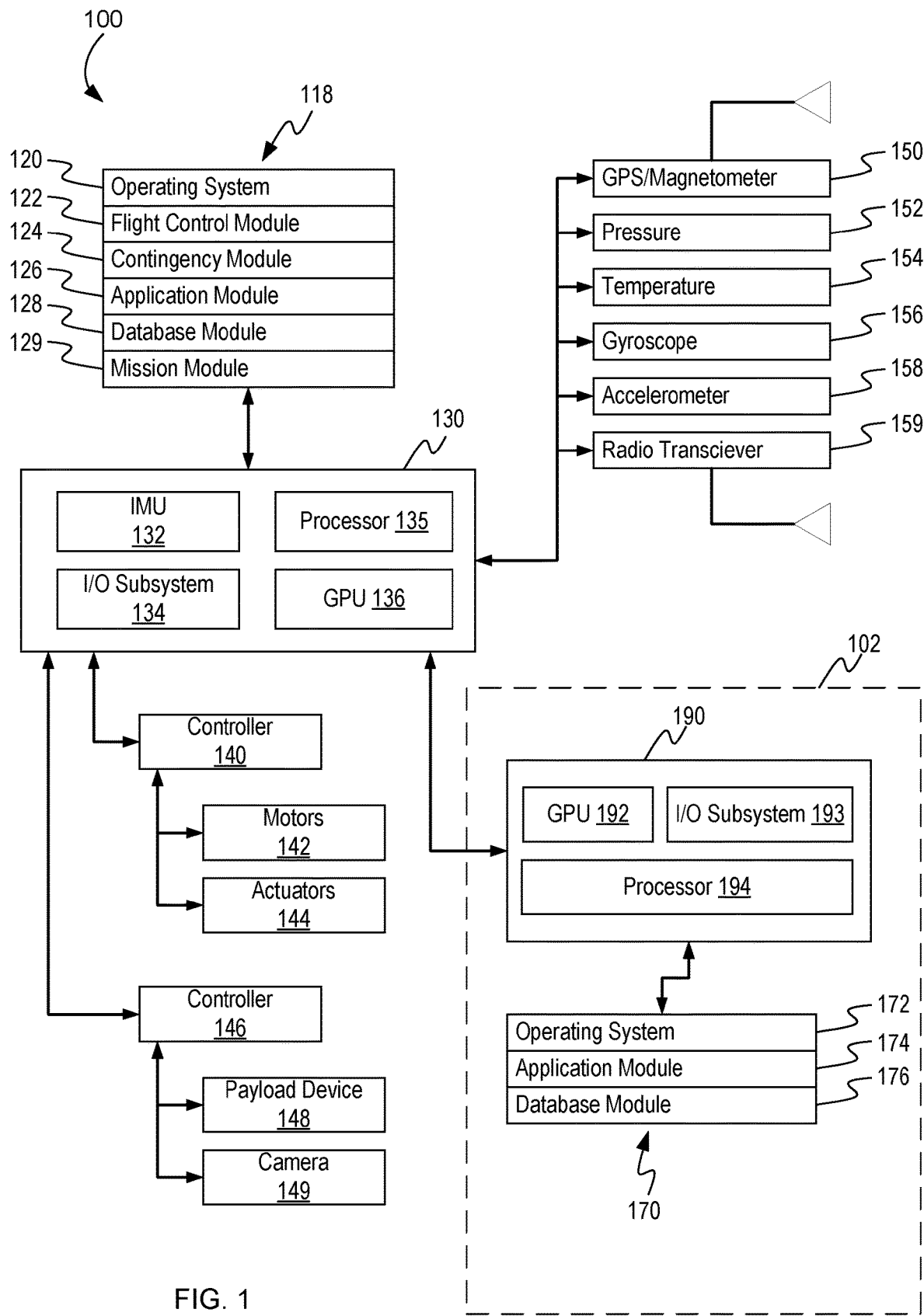
FIG. 1 illustrates a block diagram of an example unmanned aerial vehicle (UAV) architecture for implementing the features and processes described herein.

FIG. 1 illustrates a block diagram of an example unmanned aerial vehicle (UAV) architecture 100 for implementing the features and processes described herein. A UAV primary processing system 130 can be a system of one or more computers, or software executing on a system of one or more computers, which is in communication with, or maintains, one or more databases. The UAV primary processing system 130 can be a system of one or more processors 135, graphics processors 136, I/O subsystem 134, logic circuits, analog circuits, associated volatile and/or non-volatile memory, associated input/output data ports, power ports, etc., and/or one or more software processing executing one or more processors or computers. Memory 118 may include non-volatile memory, such as one or more magnetic disk storage devices, solid state hard drives, or flash memory. Other volatile memory such a RAM, DRAM, SRAM may be used for temporary storage of data while the UAV is operational. Databases may store information describing UAV flight operations, flight plans, contingency events, geofence information, component information, and other information.

The UAV processing system 130 may be coupled to one or more sensors, such as GPS receivers 150, gyroscopes 156, accelerometers 158, pressure sensors (static or differential) 152, temperature sensors 154, current sensors, voltage sensors, magnetometer, hydrometer, and motor sensors. The UAV may use an inertial measurement unit (IMU) 132 for use in navigation of the UAV. Sensors can be coupled to the processing system, or to controller boards coupled to the UAV processing system. One or more communication buses, such as a CAN bus, or signal lines, may couple the various sensor and components.

Various sensors, devices, firmware and other systems may be interconnected to support multiple functions and operations of the UAV. For example, the UAV primary processing system 130 may use various sensors to determine the vehicle's current geo-spatial location, attitude, altitude, velocity, direction, pitch, roll, yaw and/or airspeed and to pilot the vehicle along a specified route and/or to a specified location and/or to control the vehicle's attitude, velocity, altitude, and/or airspeed (optionally even when not navigating the vehicle along a specific path or to a specific location).

The flight control module 122 handles flight control operations of the UAV. The module interacts with one or more controllers 140 that control operation of motors 142 and/or actuators 144. For example, the motors may be used for rotation of propellers, and the actuators may be used for flight surface control such as ailerons, rudders, flaps, landing gear, and parachute deployment.

The contingency module 124 monitors and handles contingency events. For example, the contingency module may detect that the UAV has crossed a border of a geofence, and then instruct the flight control module to return to a predetermined landing location. Other contingency criteria may be the detection of a low battery or fuel state, or malfunctioning of an onboard sensor, motor, or a deviation from the flight plan. The foregoing is not meant to be limiting, as other contingency events may be detected. In some instances, if equipped on the UAV, a parachute may be deployed if the motors or actuators fail.

The mission module 129 processes the flight plan, waypoints, and other associated information with the flight plan as provided to the UAV in the flight package. The mission module 129 works in conjunction with the flight control module. For example, the mission module may send information concerning the flight plan to the flight control module, for example lat/long waypoints, altitude, flight velocity, so that the flight control module can autopilot the UAV.

The UAV may have various devices connected to it for data collection. For example, photographic camera 149, video cameras, infra-red camera, multispectral camera, and Lidar, radio transceiver, sonar, TCAS (traffic collision avoidance system). Data collected by the devices may be stored on the device collecting the data, or the data may be stored on non-volatile memory 118 of the UAV processing system 130.

The UAV processing system 130 may be coupled to various radios, and transmitters 159 for manual control of the UAV, and for wireless or wired data transmission to and from the UAV primary processing system 130, and optionally the UAV secondary processing system 102. The UAV may use one or more communications subsystems, such as a wireless communication or wired subsystem, to facilitate communication to and from the UAV. Wireless communication subsystems may include radio transceivers, and infra-red, optical ultrasonic, electromagnetic devices. Wired communication systems may include ports such as Ethernet, USB ports, serial ports, or other types of port to establish a wired connection to the UAV with other devices, such as a ground control system, flight planning system, or other devices, for example a mobile phone, tablet, personal computer, display monitor, other network-enabled devices. The UAV may use a light-weight tethered wire to a ground control station for communication with the UAV. The tethered wire may be removeably affixed to the UAV, for example via a magnetic coupler.

Flight data logs may be generated by reading various information from the UAV sensors and operating system and storing the information in non-volatile memory. The data logs may include a combination of various data, such as time, altitude, heading, ambient temperature, processor temperatures, pressure, battery level, fuel level, absolute or relative position, GPS coordinates, pitch, roll, yaw, ground speed, humidity level, velocity, acceleration, contingency information. This foregoing is not meant to be limiting, and other data may be captured and stored in the flight data logs. The flight data logs may be stored on a removable media and the media installed onto the ground control system. Alternatively, the data logs may be wirelessly transmitted to the ground control system or to the flight planning system.

Modules, programs or instructions for performing flight operations, contingency maneuvers, and other functions may be performed with the operating system. In some implementations, the operating system 120 can be a real time operating system (RTOS), UNIX, LINUX, OS X, WINDOWS, ANDROID or other operating system. Additionally, other software modules and applications may run on the operating system, such as a flight control module 622, contingency module 124, application module 126, and database module 128. Typically flight critical functions will be performed using the UAV processing system 130. Operating system 120 may include instructions for handling basic system services and for performing hardware dependent tasks.

In addition to the UAV primary processing system 130, a secondary processing system 190 (102) may be used to run another operating system to perform other functions. A UAV secondary processing system 190 can be a system of one or more computers, or software executing on a system of one or more computers, which is in communication with, or maintains, one or more databases. The UAV secondary processing system 190 can be a system of one or more processors 194, graphics processors 192, I/O subsystem 194 logic circuits, analog circuits, associated volatile and/or non-volatile memory, associated input/output data ports, power ports, etc., and/or one or more software processing executing one or more processors or computers. Memory 170 may include non-volatile memory, such as one or more magnetic disk storage devices, solid state hard drives, flash memory. Other volatile memory such a RAM, DRAM, SRAM may be used for storage of data while the UAV is operational.

Ideally modules, applications and other functions running on the secondary processing system 190 will be non-critical functions in nature, that is, if the function fails, the UAV will still be able to safely operate. In some implementations, the operating system 172 can be based on real time operating system (RTOS), UNIX, LINUX, OS X, WINDOWS, ANDROID or other operating system. Additionally, other software modules and applications may run on the operating system 172, such as an application module 174, database module 176. Operating system 172 may include instructions for handling basic system services and for performing hardware dependent tasks.

Also, controllers 146 may be used to interact and operate a payload device 148, and other devices such as photographic camera 149, video camera, infra-red camera, multispectral camera, stereo camera pair, Lidar, radio transceiver, sonar, laser ranger, altimeter, TCAS (traffic collision avoidance system), ADS-B (Automatic dependent surveillance-broadcast) transponder. Optionally, the secondary processing system 190 may have coupled controllers to control payload devices.

Figure 2:
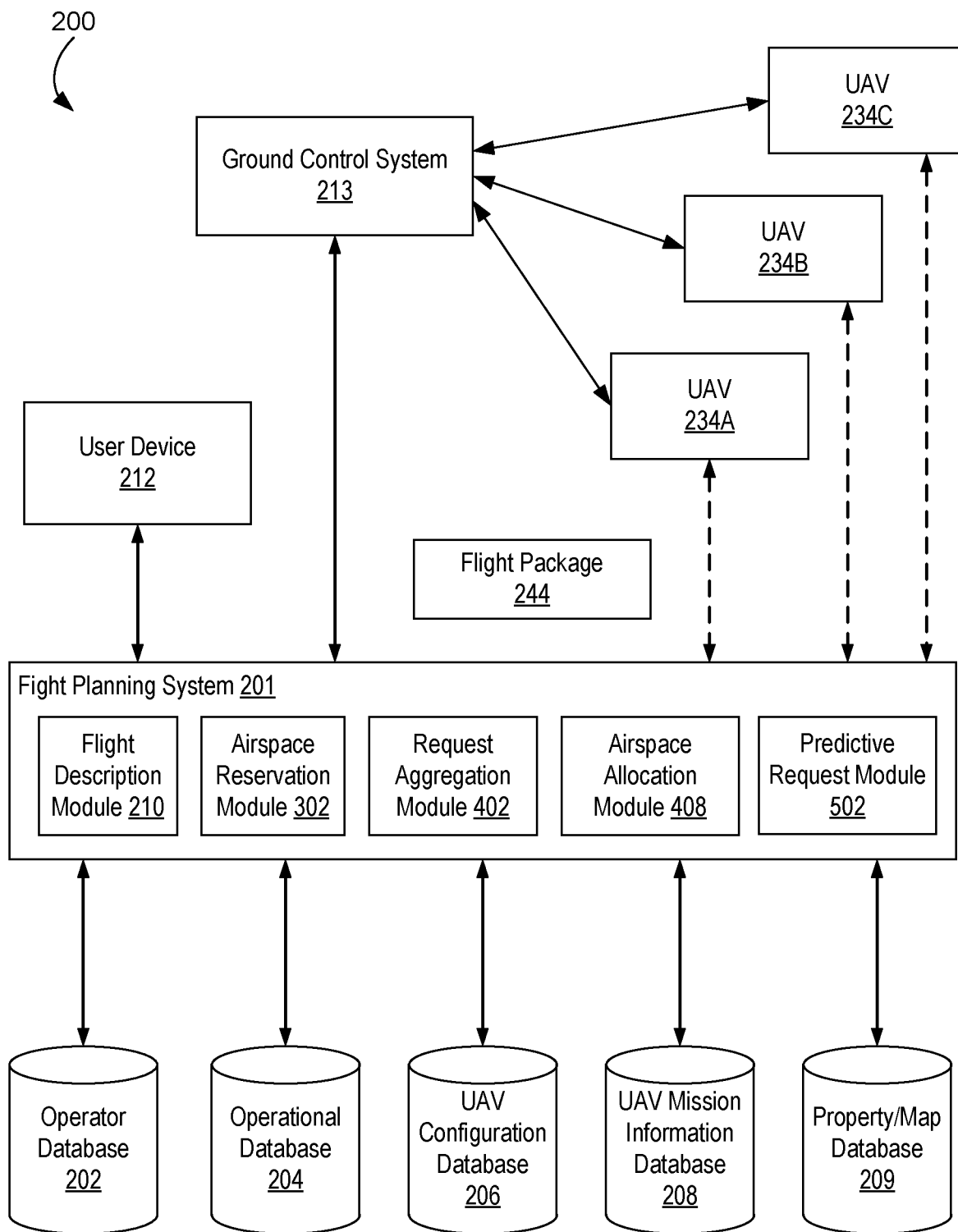
FIG. 2 is a block diagram of an example UAV flight system.

FIG. 2 is a block diagram of an example UAV flight system 200. In some implementations, system 200 can include flight planning system 201. For example, flight planning system 201 can be a system of one or more computers, or software executing on a system of one or more computers, which is in communication with, or maintains, one or more databases, e.g., databases 202-209, storing information describing UAV flight operations and components. Flight planning system 201 can be a system of one or more processors, graphics processors, logic circuits, analog circuits, associated volatile and/or non-volatile memory, associated input/output data ports, power ports, etc., and/or one or more software processing executing one or more processors or computers.

The flight planning system 201 may store, and maintain, flight operation information associated with a UAV. Flight operation information may include configuration information of each UAV (e.g., stored in database 206), flight mission and planned flight path (e.g., stored in database 208), and/or operator information (e.g., stored in database 202). Flight operation information can include the UAV's operational information (e.g., stored in operational database 204), such as the UAV's precise three-dimensional location in space, velocity information, UAV status (e.g., health of components included in the UAV), contingency plans, and so on. The flight planning system 201 can receive (e.g., from a user), and determine, information describing a flight plan, and provide a flight data package 244 associated with the flight plan to a UAV (e.g., UAV 234A, 234B, 234C) to implement. Additionally, the flight planning system 201 can store flight plan information, flight data log information, job information in the various databases.

The example flight planning system 201 includes a flight description module 210 that can generate interactive user interfaces (e.g., web pages to be rendered by a user device) for presentation on a user device (e.g., user device 212). For example, user device 212 can be a desktop computer, laptop computer, server, tablet computer, or any other computing device capable of communicating with flight planning system 201 and presenting user interfaces generated by flight planning system 201. The interactive user interfaces may optionally be transmitted for display to the user device via a wireless network or other communication channel. A user of the user device (e.g., user device 112) can provide input to user device 112 describing a flight plan to be performed (e.g., by UAV 134).

In some implementations, the ground control system (GCS) 213 may also act as a user device for interacting with the flight planning system. For example, GCS 213 can include the functionality and features of user device 212 while also being configured to communicate with and control one or more UAVs (e.g., UAV 234A, 234B, 234C) while the UAVs are in flight. For example, GCS 213 can receive information from flight planning system 201 describing a UAV's flight through reserved airspace. For example, flight planning system 201 can receive (e.g., real-time) UAV location information and transmit the information to GCS 213. GCS 213 can present on a display of GCS 213 a time-based graphical representation of a flight through the reserved airspace based on the information received from flight planning system 201.

Figure 3:
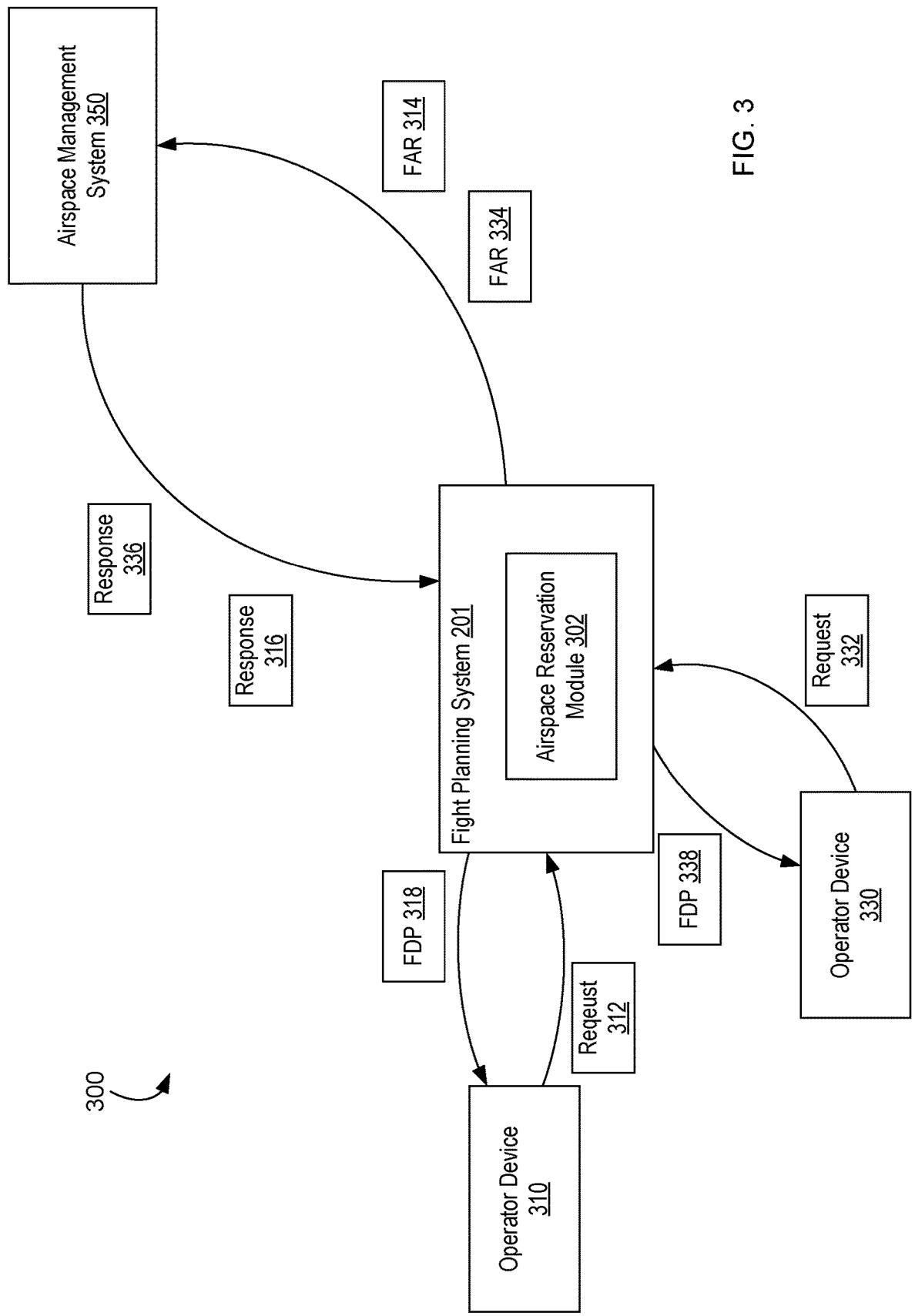
FIG. 3 is a block diagram of an example airspace reservation system for reserving airspace for UAV operations.

FIG. 3 is a block diagram of an example airspace reservation system 300 for reserving airspace for UAV operations. In some implementations, airspace reservation system 300 can include flight planning system 201. For example, flight planning system 201 can include airspace reservation module 302 for processing airspace reservation requests received from operator devices, or other systems, such as a cloud-based system.

In some implementations, airspace reservation system 300 can include operator device 310 and/or operator device 330. For example, operator device 310 and/or 330 can correspond to user device 212 and/or ground control system 213 of FIG. 2. Operator device 310 and/or 330 can communicate with flight planning system 201 through a wired or wireless network to request an airspace reservation. For example, operator device 310 can correspond to user device 212 and/or ground control system 213 of FIG. 2.

In some implementations, a UAV operator can use operator device 310 to request an airspace reservation. For example, the UAV operator can interact with operator device 310 to generate a flight plan for a UAV operation. The operator device 310 can generate a flight plan with inputs specifying take off and/or landing areas and a sequence of waypoints (e.g., geospatial locations) that define a flight path along which the UAV operator would like to autonomously fly a UAV. The UAV operator can provide input to operator device 310 to specify a desired time window (e.g., start time, end time) during which the UAV operator would like to fly the UAV.

In some implementations, when generating the flight plan, the UAV operator can provide input to operator device 310 to specify the type of UAV the operator plans to fly. For example, the UAV operator can specify the technical attributes (e.g., parameters, features, equipment, etc.) of the UAV the operator intends to fly. For example, the technical attributes of the UAV can include a UAV identifier (e.g., tail number, registration number, model number, etc.), the type of aircraft (e.g., fixed wing, rotary wing, etc.), the size of the aircraft, an aircraft classification, the operating altitude of the aircraft, and/or a payload description or identifier. In some implementations, these UAV attributes may be previously stored in a database accessible to operator device 310 and the UAV operator can simply input a UAV identifier or payload identifier to retrieve the UAV attributes from the database and populate the flight plan with the appropriate UAV attributes.

In some implementations, the flight plan can include a contingency specification. For example, the UAV operator can provide input to operator device 310 to describe or indicate a contingency maneuver for the UAV should something go wrong or malfunction while the UAV is being flown according to the flight plan. For example, the contingency maneuver can be to fly to a landing zone along a specified flight path, parachute out of the sky, or land at the UAV's current location. For example, if the UAV is a fixed wing aircraft, then the UAV operator can specify a flight path to an emergency landing area. If the UAV is a fixed wing aircraft with a parachute, then the UAV operator can specify that the UAV will deploy the parachute in an emergency and fall out of the sky. Thus, no flight path may be specified for a UAV with a parachute. If the UAV is a rotary wing aircraft (e.g., helicopter, multi-copter, etc.), then the UAV operator can specify the UAV will land in place. These example contingency maneuvers should not be interpreted to be limited to a specify type of aircraft. For example, in a contingency situation, a rotary wing UAV may be configured to fly along a flight path and land in an emergency landing zone or use a parachute to land safely.

In some implementations, the flight plan can include UAV operator information. For example, the UAV operator can provide input to operator device 310 identifying a person that will be controlling (e.g., piloting) the UAV while in flight. The UAV operator can input the pilot's name, hours of flight experience, aircraft rating information indicating the types of aircraft the pilot is allowed to fly, a pilot's license number, and/or any other information indicating the operator's qualifications to fly the UAV. In some implementations, the UAV pilot's information can be stored in a database accessible to operator device 310 and/or flight planning system 201. If the pilot's information is stored in a database, then the UAV operator can simply input an identifier (e.g., pilot's license number, employee identifier, etc.) for the pilot and operator device 310 can automatically populate the flight plan with the UAV pilot's information from the database.

In some implementations, the UAV operator can provide input to operator device 310 to generate multiple flight plans for a single airspace reservation request. For example, an airspace reservation request can include a single flight plan. An airspace reservation can include multiple flight plans. For example, the UAV operator can generate a primary flight plan that specifies the ideal airspace reservation for UAV operations and one or more alternative flight plans that are suitable to the UAV operator's mission. The UAV operator can rank or prioritize the flight plans to indicate which flight plans the UAV operator prefers.

In some implementations, the UAV operator can use operator device 310 to submit an airspace reservation request to flight planning system 201. For example, after the UAV operator has configured the flight plans using operator device 310, the UAV operator can provide input to operator device 310 to send the flight plans to flight planning system 310. If the UAV operator has generated a single flight plan, operator device 310 can generate airspace reservation request 312 that includes the single flight plan. If the UAV operator has generated primary and alternative flight plans, operator device 310 can generate airspace reservation request 312 that includes the primary and alternative flight plans along with the ranking or prioritization of the included flight plans. After operator device 310 generates airspace reservation request 312, operator device 310 can send the airspace reservation request 312 to flight planning system 201. While the operator device may be used to create a flight plan, flight plan approval, and airspace reservation, the flight planning system 310 itself may have interactive user interfaces allowing for similar flight plan creation, approval, and airspace reservation functionality.

In some implementations, flight planning system 201 can include airspace reservation module 302. For example, airspace reservation module 302 can receive and process airspace reservation requests received from operator devices (e.g., operator device 310 and/or operator device 330). For example, upon receipt of an airspace reservation request (e.g., reservation request 312), airspace reservation module 302 can generate flight authorization request 314. Flight authorization request can include, for example, the flight plans (e.g., primary flight plan, alternative flight plans, etc.), UAV information, contingency information, and/or pilot information included in reservation request 312.

In some implementations, airspace reservation module 302 can generate flight authorization request 314 according to a format specified by an airspace management authority. For example, a government entity (e.g., the Federal Aviation Administration) or a private entity may be tasked with managing airspace for a geospatial region. The airspace management authority may implement a computing system (e.g., airspace management system 350) that receives and processes flight authorization requests from different requestors. To allow the airspace management system to efficiently process airspace requests, the airspace management authority may define a format for flight authorization requests that defines the structure and/or data required for the flight authorization requests. After airspace reservation module 302 generates flight authorization request 314, flight planning system 201 can send flight authorization request 314 to airspace management system 350 for approval of one or more of the flight plans in flight authorization request 314.

In some implementations, airspace management system 350 can determine whether to approve flight authorization request 314. For example, airspace management system 350 can determine whether to approve flight authorization request 314 based on a variety of criteria. These criteria can include the availability of the requested airspace, the type and payload of the UAV, and/or the experience and/or credentials of the UAV pilot, among other things.

For example, airspace for UAV operations may be organized along various schemes. Airspace may be organized using volumetric blocks (or other shapes) of space. A block may be a cube shape or any other volumetric (e.g., 3-dimensional) shape including a cylinder, cuboid, sphere, cone, etc., or a combination of various 3-dimensional shapes. Each block may have a unique identifier and/or geospatial coordinates that define the boundaries of the block. For airspace reservations, blocks may be contiguously reserved for a UAV for flight along its planned flight path. The use of the airspace may be limited to a specified time, or duration.

In some cases, an airspace block may be a special use block and have associated use requirements/restrictions, such as an available time that the block may be used, the type of UAV that may use the block (such as multi-copter, fixed wing, etc.), or UAV payload device requirements, or restrictions (such as no digital cameras allowed). The system 300 can determine based on the planned flight path of a UAV whether the UAV may need to fly through a special use block. If system 300 (e.g., flight planning system 201 and/or airspace management system 350) determines that the UAV does not meet the use requirements and/or restrictions corresponding to the airspace, then an airspace reservation request that would use the particular airspace block may be denied.

Additionally, certain blocks may be reserved for a longer period of time than other blocks. For example, a fixed-wing UAV may fly from waypoint A to waypoint B to waypoint C and waypoint D. For this example, assume that each of the waypoints use contiguous, but different airspace blocks, e.g., block B1, B2, B3 and B4. The flight plan of the UAV may indicate that the UAV will fly from waypoint A to waypoint B at a particular speed, through blocks A1 and A2 respectively. Then when reaching waypoint C, the UAV could conduct an inspection, or survey in block B3 that might last for an hour. Thus, blocks B1 and B2 may be reserved for a shorter duration than block B3.

Additionally, the blocks may be non-exclusive and non-reservable, but still may be used by a UAV so long as a request is submitted for the use of the airspace. For example, one or more blocks may be designated as multi-use, and any number of UAVs, or a maximum number, may use the block so long as a request has been submitted. An indication that the flight plan includes an airspace block that is a multi-use type may be provided by the flight planning system. When a flight authorization request, or a flight plan is approved, the flight planning system 201 may receive from the airspace management system 350 information identifying the airspace blocks that have been allocated for use by a UAV. The flight planning system may allow use of the airspace block so long as the maximum number of concurrent UAVs using the airspace block is not exceeded.

A flight data package that is sent to the ground control station or directly to the UAV may include information about the allocated airspace blocks. The UAV may be configured to treat each airspace block as a geofence such that during flight the UAV may not fly beyond the boundaries of a particular airspace block, except through adjacent airspace blocks that have been allocated for the flight plan. Additionally, a geofence may be defined for all of the allocated airspace blocks, and submitted to the UAV. The UAV then can monitor its geospatial position, and inhibit flight through non-adjacent airspace blocks. Also, the UAV can monitor the time when an airspace block becomes available. For example, UAV may be flying within an airspace block, however, an adjacent airspace block may not become available until a later time. In such situations the UAV may fly a holding or hovering pattern until the airspace block becomes available. When the airspace block becomes available, then the UAV would be free to proceed through the airspace. Effectively, an airspace block may be a time-based geofence. Also, the UAV, or a controlling ground control station, may transmit a request to the flight planning system, or the airspace management system, for early entry into the later available airspace block. Moreover, the UAV may set a buffer zone with respect to a boundary of the airspace block, to prevent unintentional boundary violation due to GPS or other flight instrument errors. The buffer zone may be sized according to the overall available space of the airspace block.

For example, if the flight plan(s) submitted in flight authorization request 314 require airspace that has already been allocated to another UAV operation, has been allocated to the maximum number of UAV operations, or allocated for a maximum number of UAVs, the airspace management system 350 can reject flight authorization request 314. If the airspace required by the flight plan(s) is a high risk or crowded airspace, airspace management system 350 might require a UAV pilot with more experience or a different rating and may reject flight authorization request 314 based on the pilot's experience and/or ratings. If the airspace required by the flight plan(s) is a high risk or crowded airspace, the UAV type and/or payload type might be too risky for the UAV to fly within the requested airspace. However, if airspace management system 350 determines that the airspace needed for the flight plan is available, the UAV and payload are suitable for the airspace, and the UAV pilot has the appropriate experience and credentials for the airspace, then the airspace management system 350 can approve the flight authorization request 314.

In some implementations, airspace management system 350 can generate flight authorization response 316 in response to flight authorization request 314. For example, flight authorization response 316 can specify whether flight authorization request 314 is approved or rejected. When airspace management system 350 rejects flight authorization request 314, airspace management system 350 can indicate the reason for the rejection in flight authorization response 316. For example, the rejection reason can be that the requested airspace is not available (e.g., the airspace has already been reserved), that the UAV and/or UAV payload is not approved for the requested airspace, and/or that the UAV pilot is not approved to operate within the requested airspace, among other things.

When airspace management system 350 approves flight authorization request 314, airspace management system can provide information in flight authorization response 316 describing the approved flight plan. For example, when flight authorization request 314 includes multiple flight plans, flight authorization response 316 can indicate which flight plan has been approved by airspace management system 350 and/or what airspace has been allocated for the UAV operations. For example, in addition to allocating airspace for the requested flight path, airspace management system 250 can allocate airspace to accommodate the contingency maneuvers specified in the flight plan. This airspace allocation can be described in flight authorization response 316.

In some implementations, airspace management system 350 can make or suggest modifications to a UAV flight plan. For example, airspace management system 350 may have data indicating that another takeoff and/or landing area is more appropriate for the requested flight plan. Airspace management system can identify the suggested takeoff and/or landing zones in flight authorization response 316 and make adoption of the suggested takeoff and/or landing zones optional or mandatory for the operator of the UAV.

Similarly, airspace management system 350 can determine that a modification to the requested flight plan time window would allow allocation of airspace for the UAV operations. Airspace management system 350 can generate a flight authorization response with a conditional approval that requires adoption of the time window specified in the flight authorization response. After airspace management system 350 generates flight authorization response 316, airspace management system 350 can send the flight authorization response 316 to flight planning system 201 where airspace reservation module 302 can process the response.

In some implementations, airspace reservation module 302 can generate a flight data package based on a flight authorization response. For example, airspace reservation module 302 can receive flight authorization response 316 and generate flight data package 318 based on the information in flight authorization response 316. If flight authorization request 314 was rejected, flight data package 318 can, for example, describe the reasons why a flight authorization request was rejected. If flight authorization request 314 was approved, flight data package 318 can describe the approved flight plan, suggested or required modifications to the flight plan (e.g., to time window and/or takeoff/landing areas), and/or other information. If flight authorization response 316 includes modifications to the flight plan, flight planning system 201 can parse the flight authorization response 316 to identify the modifications and identify the modifications to the flight plan in the flight data package 318.

In some implementations, airspace reservation module 302 can define one or more geofences for containing the UAV within the airspace authorized for the approved flight plan. Airspace reservation module 302 can include the geofence definitions in flight data package 318. After airspace reservation module 302 generates flight data package 318, flight planning system 201 can send flight data package 318 to operator device 310.

In some implementations, operator device 310 can transmit flight data package, or a portion thereof, to the UAV operator's UAV. For example, operator device 310 can transmit the flight path, takeoff and/or landing area information, contingency maneuver information, allocated airspace definition (e.g., geo-fence), etc., to the UAV operator's UAV in preparation for the UAV to fly.

In some implementations, operator device 310 can confirm modifications to the approved flight plan received in flight data package 318. For example, when airspace management system 350 suggests or requires changes to a requested flight plan, the operator device 310 can receive input 310 indicating acceptance of the suggested or required modifications. In response to receiving the user input, operator device 310 can send a message to flight planning system 201 (e.g., airspace reservation module 302) indicating that the modifications to the flight plan have been accepted. Airspace reservation module 301 can send a message to airspace management system 350 indicating that the modifications to the flight plan has been accepted so that airspace management system 350 can confirm the reservation of the airspace corresponding to the modified flight plan.

In some implementations, flight planning system 201 can process airspace reservation requests for multiple UAVs from various UAV operator devices (such as ground control systems) individually, or from various other type of computer systems used to create of flight plan. For example, when a first UAV operator device 310 request an airspace reservation and a second UAV operator device 330 requests an airspace reservation, airspace reservation module 302 can handle these requests independently or separately. Airspace reservation module 302 can, for example, receive airspace reservation request 332 from an operator device 330, generate flight authorization request 334, receive flight authorization response 336, generate flight data package 338, and send the flight data package 338 to the operator device 330 to process the airspace reservation request from operator device 330 in a similar manner as described for an airspace reservation request from operator device 310, described above. However, in some implementations, flight planning system 201 can aggregate requests received from multiple UAV operator devices into a single flight authorization request.

In some implementations, flight planning system 201 may modify the flight plan, or propose a modification for acceptance, so that so that the flight plan conforms to the requirements/restrictions for particular airspace and will be more likely to be accepted or approved by airspace management system 350. For example, flight planning system 201 can store (e.g., in map database 209) information describing the restrictions and requirements for airspace blocks. When flight planning system 201 receives an airspace reservation request from a UAV operator device, flight planning system 201 can compare the flight plan to the requirements for the airspace blocks corresponding to the flight plan and propose adjustments to the flight plan so that the flight plan will be approved by airspace management system 350.

For example, a flight plan submitted by a UAV operator may have set the UAV flight path at an altitude of 200 feet. A particular airspace block through which the UAV will fly may have a minimum altitude requirement of 230 feet. Flight planning system 201 may proactively modify UAV flight altitude for the section of the flight plan that passes through the particular airspace to 230 feet so that the flight plan meets the minimum requirements for the airspace block and will be approved by airspace management system 350. In some implementations, flight planning system 201 may require confirmation from the UAV operator (e.g., from operator device 310) that the change to the flight plan is acceptable before reserving the airspace for the flight based on the modified flight plan. Additionally, the UAV may receive in flight modifications from flight planning system 201 directly adjusting the UAV flight path.

In some implementations, as a UAV flies along an approved route, the UAV can transmit its position to the flight planning system 201. After the UAV has flown through a reserved airspace block, the flight planning system 201 can determine that the UAV will continue on a path outside of the airspace block and can release the reserved airspace block for use by other UAVs. The flight planning system 201 may release the airspace block after a specified time, or a specified distance, from the exit of the particular airspace block.

In some implementations, flight planning system 201 can provide contingency areas along the flight path. For example, flight planning system 201 may store in a database (e.g., database 209), or receive from a separate system, geographic areas that may be used by a UAV for contingency events. These contingency areas provide a safe place for the UAV to land. Flight planning system 201 can add the contingency areas to a flight plan and/or send the contingency area information to a UAV or operator device. The UAV may store the contingency areas in onboard memory and, in the event of a contingency event, try to land within the contingency area. The contingency area may be specified with geospatial coordinates. As the UAV flies along the flight path, the UAV can determine its proximity to the contingency area. If the UAV is close enough, or over a contingency area, and a contingency event occurs, the UAV may try to land in the contingency area. As the UAV flies along an approved route, the UAV may be able to transmit its position to the flight planning system 201. During a contingency event, the UAV can request additional airspace around its position. Unallocated blocks may be then reserved for the UAV to handle its contingency situation. Also, other UAVs in the area may be notified via the flight management system of the UAV's contingency situation.

Figure 4:
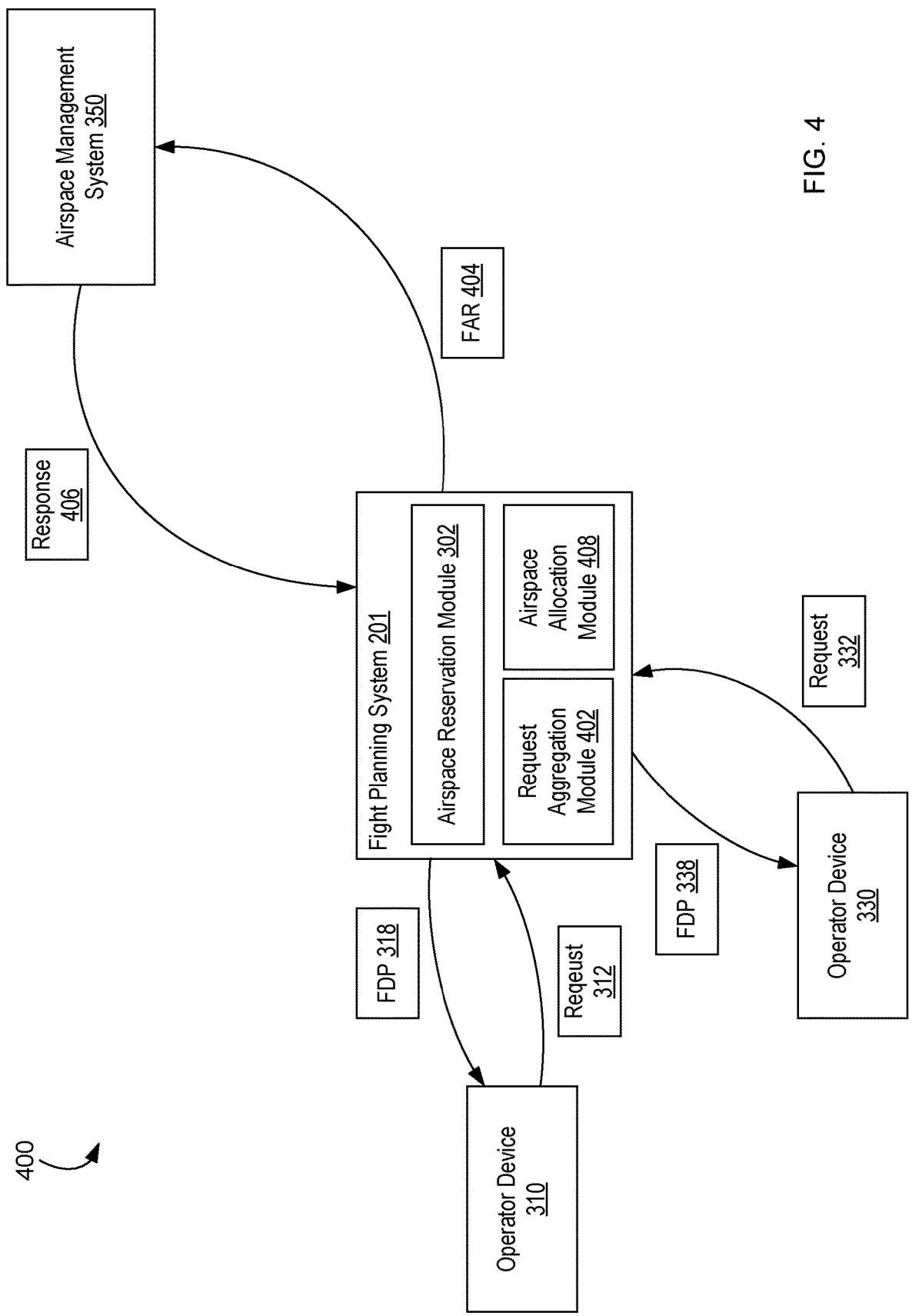
FIG. 4 is a block diagram of an example system for aggregating airspace reservation requests.

FIG. 4 is a block diagram of an example system 400 for aggregating airspace reservation requests. For example, system 400 can include a flight planning system 201 that can combine airspace reservation requests for multiple UAV operations into a single flight authorization request to reduce the number of requests submitted to airspace management system 350 thereby reducing the network bandwidth and processing power required to service flight authorization requests.

In some implementations, flight planning system 201 can receive airspace reservation requests for multiple UAV operations. As described above, airspace reservation module 302 can receive airspace reservation request 312 from operator device 310. Airspace reservation module 302 can receive airspace reservation request 332 from operator device 330. Operator device 310 and operator device 330 can correspond to different UAV operator entities (e.g., inspection businesses, insurance companies, delivery services, etc.), for example. When airspace reservation module 302 receives airspace reservation request 312 and airspace reservation request 332, airspace reservation module 302 can send the airspace reservation requests to request aggregation module 402 of flight planning system 201.

In some implementations, request aggregation module 402 can combine multiple airspace reservation requests (e.g., airspace reservation requests 312 and 332) into a single flight authorization request 404. Request aggregation module 402 can use various criteria to combine airspace reservation request 312 and airspace reservation request 332. For example, request aggregation module 402 can combine airspace reservation requests based on a UAV operator identifier in the airspace reservation request. Request aggregation module can, for example, combine airspace reservation requests received that are received from the same operator within a short period of time. Request aggregation module 402 can combine airspace reservation requests from different UAV operator devices when the requests are received with a short period of time. For example, when flight planning system 201 receives multiple airspace requests from different UAV operator devices within a short period of time, request aggregation module can combine the requests into a single flight authorization request. Request aggregation module 402 can combine reservation requests based on geography. For example, if flight planning system 201 receives multiple airspace reservation requests that specify flight plans within close proximity of other flight plans, request aggregation module 402 can combine the airspace reservation requests into a single flight authorization request. After request aggregation module 402 combines airspace reservation requests 312 and 332 into a single flight authorization request 404, flight planning system 201 can send flight authorization request 404 to airspace management system 350.

In some implementations, airspace management system 350 can generate a flight authorization response 406 based on flight authorization request 404. For example, flight authorization response 406 can include approval or authorization of one or more flight plans submitted to airspace management system in flight authorization request 404. Flight authorization response 406 can include a description or definition of the airspace allocated or reserved for UAV operations to fly designated UAVs according to flight plans specified in flight authorization request 404. After airspace management system 350 generates the flight authorization response indicating the approved flight plans, airspace management system 350 can send the flight authorization response 406 to flight planning system 201.

In some implementations, flight planning system 201 can include airspace allocation module 408 for allocating airspace to UAV operations. For example, upon receipt of flight authorization response 406, airspace allocation module can parse flight authorization response 406 can determine the approved flight plans and UAV operations corresponding to the approved flight plans. For example, airspace allocation module 408 can determine whether flight authorization response 406 includes an approved flight plan for the UAV operator corresponding to operator device 310. When airspace allocation module determines that flight authorization response 406 includes an approved flight plan for operator device 310, airspace allocation module 408 can extract the flight authorization response information relevant to operator device 310 and generate flight data package 318 for operator device 310.

Similarly, airspace allocation module 408 can determine whether flight authorization response 406 includes an approved flight plan for the UAV operator corresponding to operator device 330. When airspace allocation module determines that flight authorization response 406 includes an approved flight plan for operator device 330, airspace allocation module 408 can extract the flight authorization response information relevant to operator device 330 and generate flight data package 338 for operator device 330. After airspace allocation module 408 generates the flight data packages 318 and/or 332, airspace reservation module 302 can send flight data packages 318 and/or 332 to operator devices 310 and/or 330, respectively. Upon receipt of the flight data packages, operator devices 310 and/or 330 can then configure the corresponding UAVs to operate according to the respective flight data packages 318 and/or 338. For example, operator devices 310 and/or 330 can send the flight data packages to their respective UAVs to configure the UAVs to fly according to the approved flight plans in the flight data packages.

Figure 5:
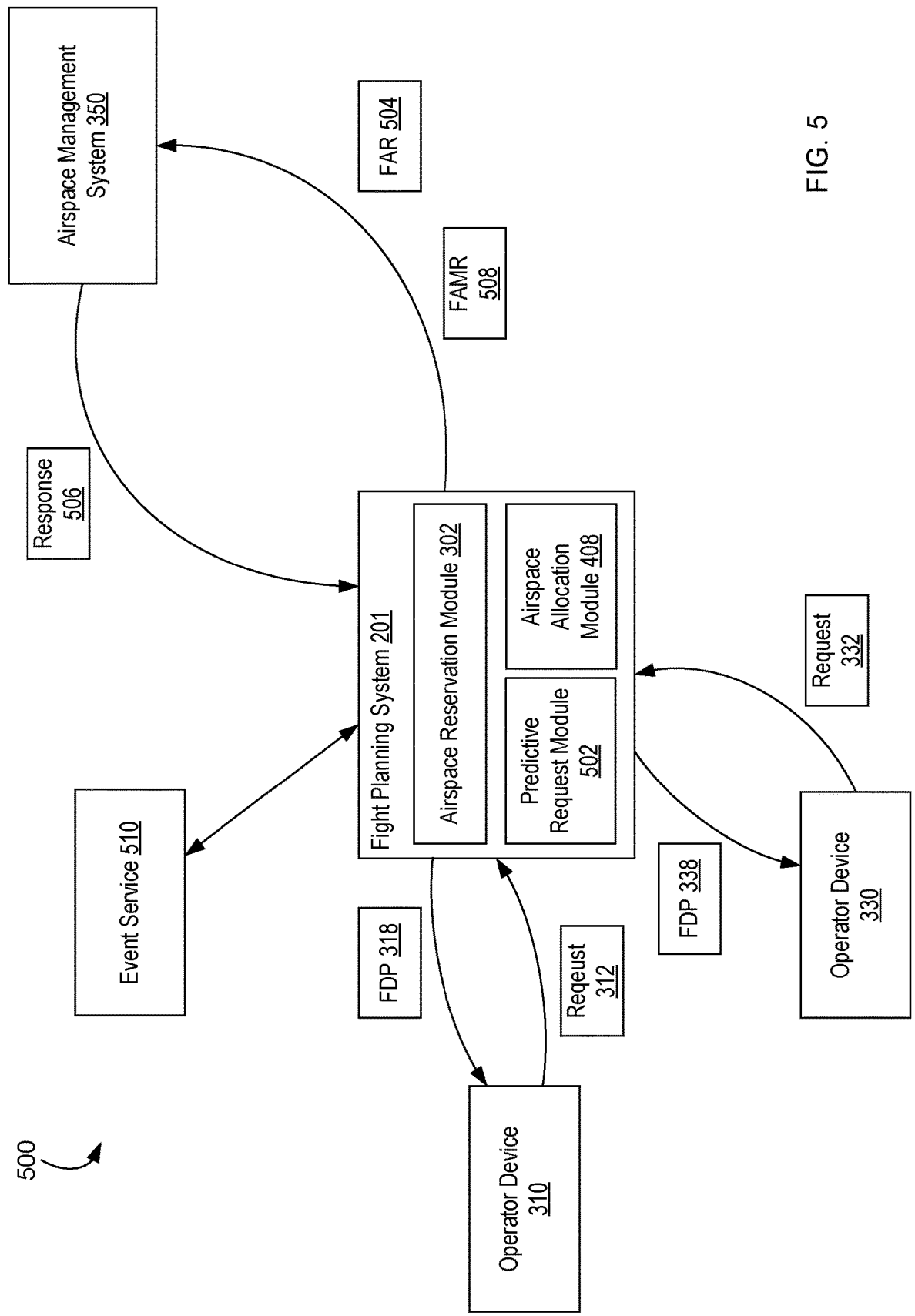
FIG. 5 is a block diagram of an example system for predictively reserving airspace for UAV operations.

FIG. 5 is a block diagram of an example system 500 for predictively reserving airspace for UAV operations. In some implementations, flight planning system 201 can predictively generate and submit flight authorization requests to airspace manager 350. For example, flight planning system 201 can receive event data from event service 510 and reserve airspace from airspace management system 350 according to an anticipated airspace need as indicated by the event data received from event service 510.

Event service 510 can be, for example, an online (e.g., network, Internet, etc.) service that provides information about current or future events. For example, event service 510 can be a weather service that provides weather reports to flight planning system 501. The weather reports can describe current and/or future weather over a geospatial region that might cause damage to buildings, roads, powerlines, erode natural and/or manmade features, etc. Event service 510 can be an accident reporting service. For example, event service 510 can report major or minor vehicle accidents, train derailments, airplane crashes, building collapses, and/or other events that might cause damage to people or property. Each of these events may result in an UAV operator flying a UAV over the affected area to capture images for inspecting the damage caused by the events. Thus, it might be beneficial if flight planning system 201 could anticipate the need for airspace over the geospatial areas affected by these or similar events and reserve the airspace before a UAV operator makes an airspace reservation request.

In some implementations, flight planning system 201 can include predictive request module 502. For example, predictive request module 502 can receive event data from event service 510. Predictive request module 502 can analyze the event data to determine whether the event data describes an event that may cause a UAV operator to submit an airspace reservation request. For example, predictive request module 502 can determine whether the event data describes an event (e.g., hail storm, tornado, flood, earthquake, vehicle accident, etc.) that might cause property damage.

When predictive request module 502 determines that the event might cause property damage, predictive request module 502 can determine the time during which the event took place or will take place in the future. For example, if the event has happened more than a threshold amount of time in the past (e.g., a day, a week, etc.), then predictive request module 502 can determine that no anticipatory request for airspace should be generated and flight planning system 201 will wait until airspace reservation requests are received from UAV operator devices before submitting flight authorization requests to airspace management system 350.

When predictive request module 502 determines that the event might cause property damage and that the event has just happened (e.g., less than the threshold amount of time has passed) or that the event will happen in the future, predictive request module 502 can determine that an anticipatory or predictive request for airspace should be generated. For example, predictive request module 502 can generate one or more flight authorization requests in anticipation of UAV operator devices requesting airspace to fly over and/or inspect the geospatial areas affected by the event.

In some implementations, predictive request module 502 can generate one or more flight authorization requests in response to receiving event data from event service 510. For example, when predictive request module 502 determines that airspace should be reserved for a current or future event, predictive request module 502 can generate one or more anticipatory flight authorization requests. Predictive request module 502 can generate the one or more anticipatory flight authorizations requests before receiving airspace reservation requests from UAV operator devices, for example.

Predictive request module 502 can generate anticipatory flight authorization requests for a time and geospatial area indicated or derived from the event data. For example, if the event is a current event that just happened in a specific geospatial area, then predictive request module 502 can generate anticipatory flight requests that fall within a period of time starting at the time (e.g., current time) when the event data was received and ending at a time in the future (e.g., one day, two days). For example, if UAV operations are usually perform damage inspections within a day or two of an event, then predictive request module 502 can generate anticipatory flight authorization requests that cover the next two days of inspections for the geospatial area affected by the event. If the event will happen in the future (e.g., a predicted weather event), then predictive request module 502 can generate anticipatory flight authorization requests for a time period starting when the future event is predicted to end and ending at a time in the future (e.g., determined based on historical or normal inspection periods).

In some implementations, predictive request module 502 can generate anticipatory flight authorization requests based on historical airspace reservation requests. For example, if a geospatial area is regularly affected by weather events, flight planning system 201 may have previously received airspace reservation requests for UAV operations in a particular area. Flight planning system 201 can store the airspace reservation requests and/or flight authorization requests as historical data and generate future anticipatory flight authorization requests based on the previous airspace reservation requests or flight authorization requests associated with the affected geospatial area. For example, flight planning system 201 can resubmit to airspace management system 350 the previously submitted flight authorization request using updated time information for the current event.

In some implementations, predictive request module 502 can generate anticipatory flight authorization request based on map data for the geospatial area affected by the event. For example, predictive request module 502 can obtain the map data from map database 209 of FIG. 2. For example, predictive request module 502 can analyze map data for the geospatial area to identify structures, features, and/or other object that might need to be inspected after the event. Predictive request module 502 can automatically generate a flight plan for inspecting the identified objects and generate a flight authorization request based on the flight plan. Predictive request module 502 can automatically generate one or more flight paths for inspecting the objects identified in the map. Predictive request module 502 can specify the time for conducting the flight based on when the event occurred or will occur, as described above. Predictive request module 502 can populate the flight plan with data corresponding to the most commonly used UAVs for inspecting the types of objects in the geospatial area. Predictive request module 502 can include placeholder (e.g., dummy, default, etc.) UAV pilot information in the flight plan. Predictive request module 502 can include UAV pilot information corresponding to a UAV pilot associated with the operator of flight planning system 201. After predictive request module 502 automatically generates the flight plan or plans, predictive request module 502 can generate flight authorization request 504 based on the generate flight plan and send flight authorization request 504 to airspace management system 350.

In some implementations, upon receipt of flight authorization request 504, airspace management system 350 can determine whether to approve or reject flight authorization request 504. For example, flight authorization request 504 can be an anticipatory flight authorization request submitted by flight planning system 201 in anticipation of receiving airspace reservation requests for one or more UAV operations. Airspace management system 350 can determine whether to approve or reject flight authorization request 504 based on the availability of the airspace corresponding to the flight paths at the flight times specified in the flight plans included in the flight authorization request 504. Airspace management system 350 can determine whether to approve or reject flight authorization request 504 based on the UAV pilot information and/or UAV information included in the flight plans of flight authorization request 504. Airspace management system 350 can generate flight authorization response 506 that indicates approval or rejection of the submitted flight authorization request 504, as described above with reference to FIG. 3 and FIG. 4. Airspace management system 350 can send the generated flight authorization response 506 to flight planning system 201.

In some implementations, flight planning system 201 can receive flight authorization response 506. For example, flight planning system 201 can store the flight authorization response 506 and/or the approved flight plan information described in flight authorization response 506. Flight planning system 201 can subsequently allocate the airspace reserved for the approved flight plans to UAV operators who submit airspace reservation requests corresponding to the reserved airspace to flight planning system 201.

In some implementations, operator device 310 can submit airspace reservation request 312 to flight planning system 201. Upon receipt of airspace reservation request 312, flight planning system 201 (e.g., airspace allocation module 408) can determine whether the requested airspace (e.g., the airspace corresponding to the flight plan(s) identified in the airspace reservation request 312) has already been reserved by flight planning system 201. If flight planning system 201 has already received a flight authorization approval for the airspace corresponding to airspace reservation request 312, then flight planning system 201 can allocate the airspace to the UAV operator corresponding to operator device 312. For example, flight planning system 201 can allocate the airspace reserved by flight planning system 201 to the UAV operator and send the UAV operator device 310 a flight data package 318 defining the preapproved flight plan(s).

In some implementations, flight planning system 201 can submit a flight authorization modification request 508 to airspace management system 350 to make modifications or updates to previously approved flight plans. For example, since an anticipatory flight authorization request may be generated and submitted by flight planning system 201 without information about the actual UAV pilot, flight planning system 201 can submit a flight authorization modification request 508 to update a previously approved flight plan with the correct or actual UAV pilot information, UAV specification and/or UAV payload information. For example, after flight planning system 201 receives the airspace allocation request 312 from operator device 312, airspace allocation module 408 can determine whether flight planning system 201 has previously (e.g., anticipatorily, presumptively, predictively, etc.) reserved the airspace corresponding to the airspace allocation request. When flight planning system 201 has already reserved the airspace, airspace allocation module 408 can allocate the reserved airspace to the UAV operator corresponding to operator device 310. Before sending flight data package 318 to operator device 310, airspace allocation module 408 can generate flight authorization modification request 508 that identifies the previously approved flight plan and updates the UAV pilot information, UAV specification, and/or UAV payload information according to the information in airspace reservation request 312. Since the airspace was previously reserved for the flight plan, airspace management system 350 does not need to check for airspace reservation conflicts. Airspace management system 350 merely needs to determine whether the update pilot, UAV specification, and/or UAV payload are appropriate for the airspace.

After airspace management system 350 approves the flight authorization modification request 508, airspace management system can send a flight authorization response to flight planning system 201 indicating that the flight plan modification(s) were approved. Upon receipt of the flight authorization response, airspace allocation module 408 can generate a flight data package 318 that describes the approved flight plan(s) and send the flight data package 312 to operator device 310. By reserving airspace in response to event information instead of waiting for airspace reservation requests from UAV operators, flight planning system 201 can ensure that UAV operators served by flight planning system 201 have access to the airspace they need to perform the flights they desire.

Example Processes

Figure 6:
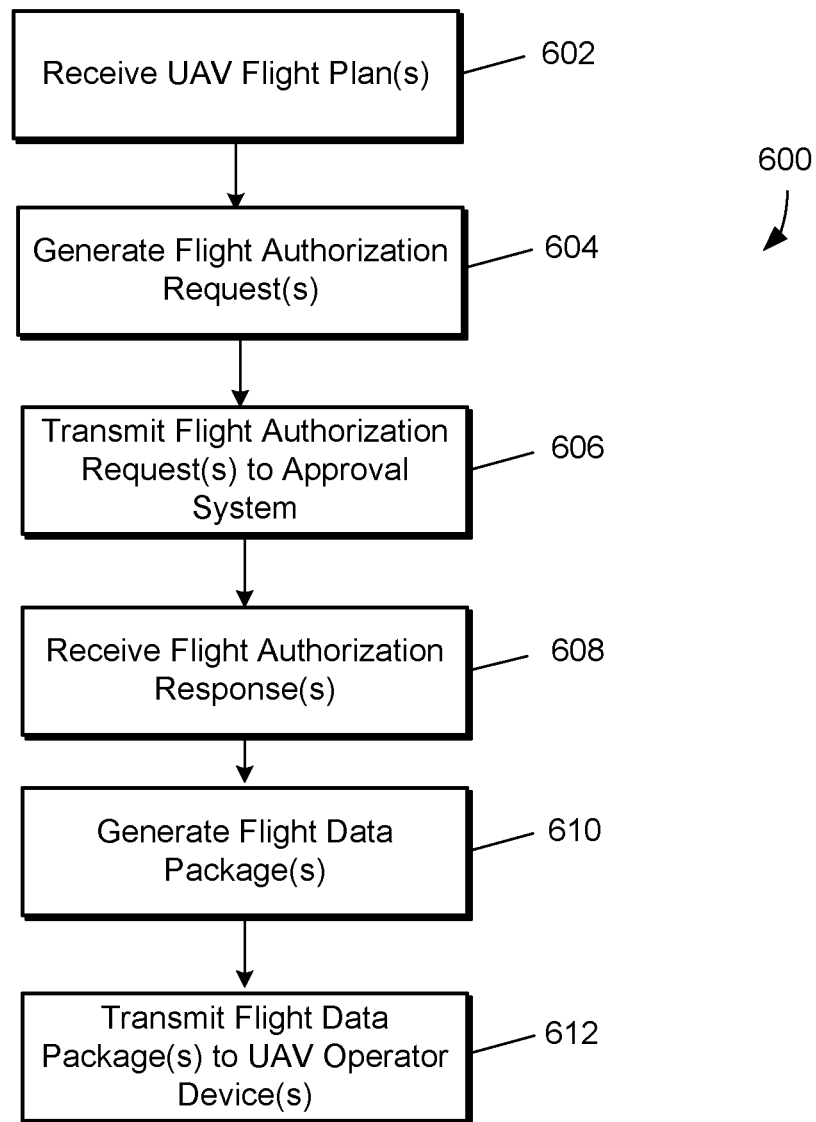
FIG. 6 is a flow diagram of an example process for reserving airspace for UAV flight operations.

FIG. 6 is a flow diagram of an example process 600 for reserving airspace for UAV flight operations. In some implementations, flight planning system 201 can act as a proxy to reserve airspace for UAV operations. Flight planning system 201 can service airspace reservation requests for UAV operations and/or UAV operator devices individually. Flight planning system 201 can service multiple airspace reservation requests from multiple UAV operator devices and combine the airspace reservation requests into a combined (e.g., aggregated, batched, etc.) flight authorization request.

At step 602, flight planning system 201 can receive one or more UAV flight plans. For example, flight planning system 201 can receive airspace reservation requests from UAV operator devices. Each airspace reservation request can define one or more flight plans, as described above.

At step 604, flight planning system 201 can generate a flight authorization requests based on the UAV flight plans. For example, flight planning system 201 can generate one or more flight authorization requests based on the information (e.g., flight plans) included in the airspace reservation requests. Flight planning system 201 can generate a single flight authorization request for each airspace reservation request received. Flight planning system 201 can generate a single flight authorization request for multiple airspace reservation requests. For example, flight planning system 201 can combine multiple flight plans from multiple UAV operator devices into a single flight authorization request.

At step 606, flight planning system 201 can transmit the flight authorization requests to a flight plan approval system. For example, flight planning system 201 can send (e.g., through a network, the Internet, etc.) the generated flight authorization requests to airspace management system 350 for approval of one or more of the flight plans in the flight authorization requests.

At step 608, flight planning system 201 can receive one or more flight authorization responses. For example, airspace management system 350 can approve or reject the flight plans in the flight authorization request and generate a flight authorization response identifying the approved or rejected flight plans, identifying modifications to flight plans, and/or reasons for rejecting the rejected flight plans.

At step 610, flight planning system 201 can generate flight packages for the approved flight plans. For example, flight planning system 201 can send a message to operator devices indicating that rejected flight plans were rejected by the approval authority (e.g., approval system). For approved flight plans, flight planning system 201 can generate flight data packages that describe the approved flight plans, modifications to the flight plans, and/or any additional restrictions or requirements specified by the approval authority.

At step 612, flight planning system 201 can transmit the flight data packages to the UAV operator devices. For example, flight planning system 201 can transmit the generated flight data packages to operator devices 310 and/or 330. After the flight data packages are received, operator devices 310 and/or 330 can transmit data (e.g., flight plan, airspace reservation information, geofence information, etc.) from the flight data package to the UAV to be flown according to the approved flight plan.

Figure 7:
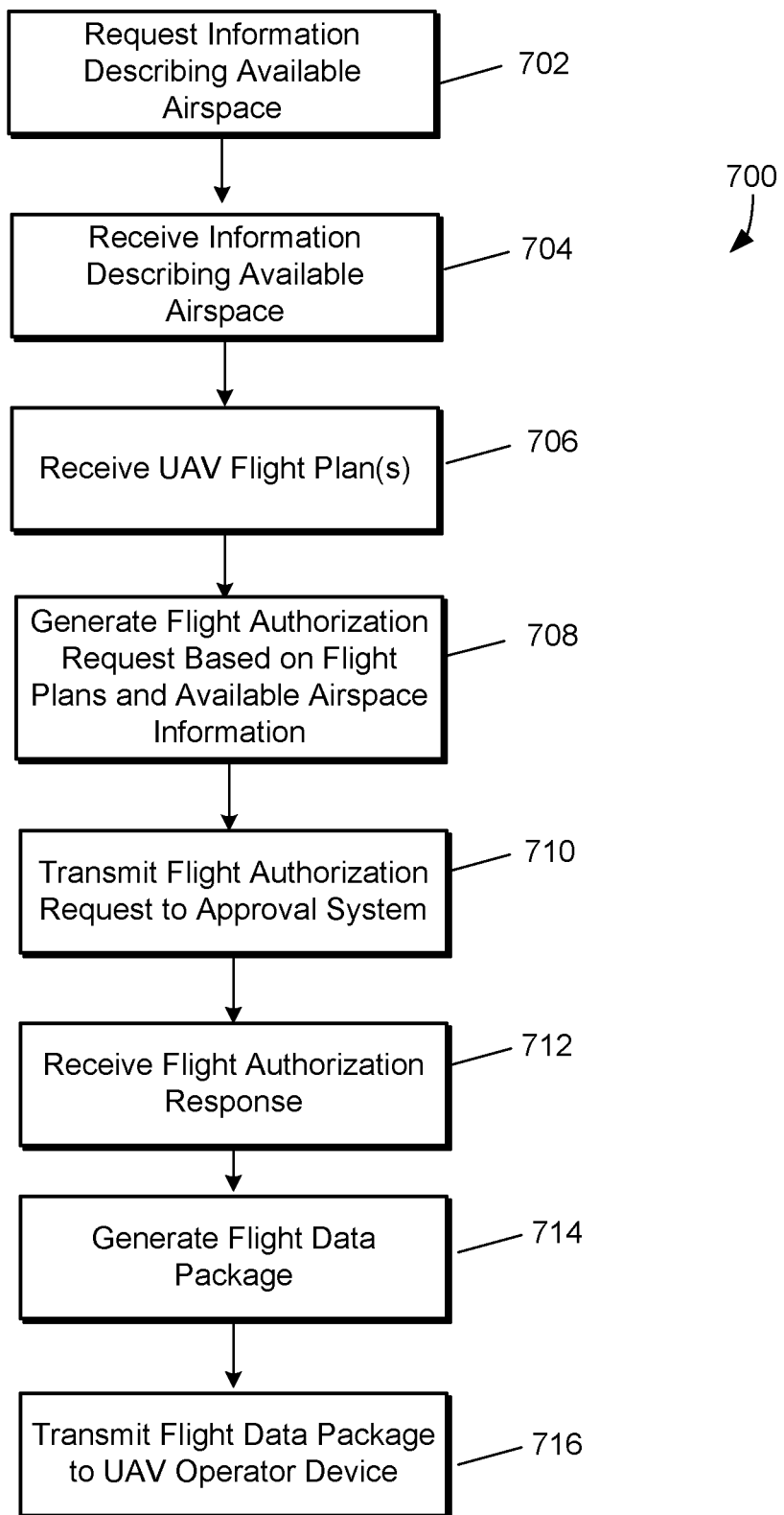
FIG. 7 is a flow diagram of an example process for reserving airspace for UAV flight operations based on available airspace.

FIG. 7 is a flow diagram of an example process 700 for reserving airspace for UAV flight operations based on available airspace. For example, flight planning system 201 can generate flight plans and/or flight authorization requests based on available airspace.

At step 702, flight planning system 201 can request information describing available airspace from a flight approval system. For example, flight planning system 201 can generate an available airspace request that specifies a geospatial area and a time period of interest. Flight planning system 201 can send the available airspace request to airspace management system 350.

At step 704, flight planning system 201 can receive information describing available airspace from the flight approval system. For example, flight planning system 201 can receive a reply message from airspace management system 350 indicating blocks of airspace within the specified geospatial area and within the time period of interest that are not currently reserved for UAV operations.

At step 706, flight planning system 201 can receive one or more UAV flight plans. For example, flight planning system 201 can receive airspace reservation requests from UAV operator devices. Each airspace reservation request can define one or more flight plans, as described above. In some implementations, flight planning system 201 can confirm that a requested airspace block does not conflict with a reserved airspace block. For example, when flight planning system 201 receives an airspace reservation request, flight planning system 201 can compare the flight plan in the airspace reservation request to the blocks of available airspace identified by the airspace management system to determine whether the airspace needed for the requested flight plan has already been reserved for another UAV or flight plan. If the airspace is available (e.g., has not already been reserved), flight planning system 201 can send a message to the UAV operator (e.g., operator device 310) confirming that the airspace needed for the operator's flight plan is available.

At step 708, flight planning system 201 can generate a flight authorization requests based on the UAV flight plans and available airspace information. For example, flight planning system 201 can modify or adjust the flight plans received in the airspace reservation requests so that the flight plans fit within the available airspace. Flight planning system 201 can adjust the takeoff/landing areas, waypoints, flight times, so that the flight plans fit within the geospatial and time constraints of the available airspace. Flight planning system 201 can generate one or more flight authorization requests based on the adjusted flight plans. By adjusting the requested flight plans to fit within the available airspace, flight planning system 201 can increase the likelihood that the approval authority (e.g., airspace management system 350) will approve the flight plans and authorize the UAV flights.

At step 710, flight planning system 201 can transmit the flight authorization requests to the flight plan approval system. For example, flight planning system 201 can send (e.g., through a network, the Internet, etc.) the generated flight authorization requests to airspace management system 350 for approval of one or more of the flight plans in the flight authorization requests.

At step 712, flight planning system 201 can receive one or more flight authorization responses. For example, airspace management system 350 can approve or reject the flight plans in the flight authorization request and generate a flight authorization response identifying the approved or rejected flight plans, identifying modifications to flight plans, and/or reasons for rejecting the rejected flight plans.

At step 714, flight planning system 201 can generate flight packages for the approved flight plans. For example, flight planning system 201 can send a message to operator devices indicating that rejected flight plans were rejected by the approval authority (e.g., approval system). For approved flight plans, flight planning system 201 can generate flight data packages that describe the approved flight plans, modifications to the flight plans, and/or any additional restrictions or requirements specified by the approval authority.

At step 716, flight planning system 201 can transmit the flight data packages to the UAV operator devices. For example, flight planning system 201 can transmit the generated flight data packages to operator devices 310 and/or 330. After the flight data packages are received, operator devices 310 and/or 330 can transmit data (e.g., flight plan, airspace reservation information, geofence information, etc.) from the flight data package to the UAV to be flown according to the approved flight plan.

Figure 8:
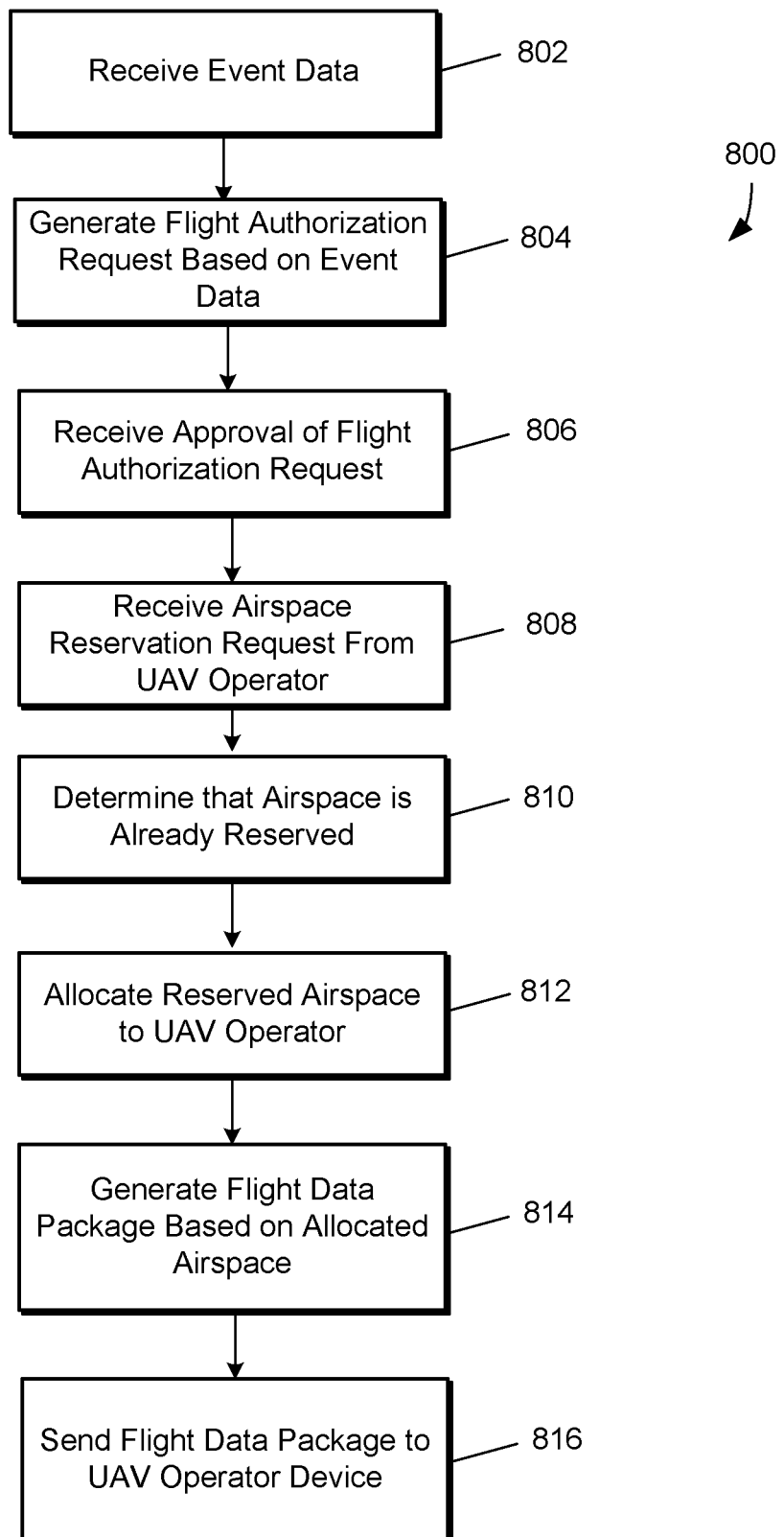
FIG. 8 is a flow diagram of an example process for predictively reserving airspace for UAV flight operations.

FIG. 8 is a flow diagram of an example process 800 for predictively reserving airspace for UAV flight operations. For example, flight planning system 201 can predictively reserve airspace in response to receiving event data that indicates an event for which airspace should be reserved. Flight planning system 201 can reserve the airspace before an airspace reservation request is received from a UAV operator and subsequently allocate the reserved airspace to UAV operators after an airspace reservation request has been received.

At step 802, flight planning system 201 can receive event data. For example, the event data can indicate a past, present, or future event. The event data can include weather events, natural disasters, vehicle accidents, etc. The event data can be received from a networked (e.g., Internet) event reporting service (e.g., weather service, traffic service, news service, etc.). The event data can include a description of the event, a time when the even occurred or is expected to occur, and/or a time when the event is expected to end.

At step 804, flight planning system 201 can generate a flight authorization request based on the received event data. For example, flight planning system 201 can generate the flight authorization request in response to receiving the event data. Flight planning system 201 can generate flight plans for the flight authorization request based on historical flight plans for the geospatial area affected by the event. Flight planning system 201 can generate flight plans for the flight authorization request based on map data and detected objects (e.g., houses, freeways, agricultural fields, barns, warehouses, etc.) in the map data. For example, flight planning system 201 can generate flight plans for inspecting each of the detected objects in the affected geospatial area. Flight planning system 201 can determine a start time and/or end time for the flight plans in the flight authorization request based on the expected end time for the event as indicated in the event data.

Flight planning system 201 can use default UAV pilot information and/or a default UAV specification as placeholders for the UAV pilot and UAV identification information in the flight plan. Alternatively, flight planning system 201 can determine what type of UAV and UAV payload is most likely (e.g., based on historical flight plans) to be used to inspect the objects within the geospatial area and use the determined typical UAV type and payload information to populate the flight plan with UAV information. After flight planning system 201 generates the flight authorization request, flight planning system 201 can send the flight authorization request to an approval authority (e.g., airspace management system 350).

At step 806, flight planning system 201 can receive approval of the flight authorization request. For example, flight planning system 201 can receive a flight authorization response from airspace management system 350 indicating which flight plans (e.g., and corresponding airspace) were approved by airspace management system 350.

At step 808, flight planning system 201 can receive an airspace reservation request from a UAV operator. For example, flight planning system 201 can receive an airspace reservation request from operator device 310. The airspace reservation request can include one or more flight plans for the geospatial area affected by the event described above.

At step 810, flight planning system 201 can determine that the airspace corresponding to the UAV operator's airspace reservation request has already been reserved by flight planning system 201. For example, flight planning system 201 can compare the flight plan(s) received from operator device 301 to the flight plans previously approved by airspace management system 350 at step 806 to determine whether the UAV operator is requesting airspace previously reserved by flight planning system 201. Since these flight plans are owned (reserved) by flight planning system 201 and not by another UAV operator, flight planning system 201 can reassign the flight plans (e.g., allocate the airspace) to a UAV operator.

At step 812, flight planning system 201 can allocate the reserved airspace to the UAV operator. For example, if the geospatial area and/or timing of a flight plan in the UAV operator's airspace reservation request corresponds to the geospatial area and/or timing of a flight plan reserved by flight planning system 201, then flight planning system 201 can allocate or assign the reserved flight plan to the UAV operator. When allocating the reserved airspace to the UAV operator, flight planning system 201 can generate an updated flight plan and send a flight authorization modification request including the updated flight plan to airspace management system 350. The updated flight plan can include UAV pilot information and UAV specification information from the UAV operator's flight plan, as described with reference to FIG. 5. In response to receiving the flight authorization modification request, airspace management system 350 can generate a flight authorization response and send the response to flight planning system 201 approving the changes to the previously approved flight plan.

At step 814, flight planning system 201 can generate a flight data package based on the allocated airspace. For example, flight planning system 201 can generate a flight data package that includes the flight plan approved by airspace management system 350. The flight data package can include geofence definitions generated by flight planning system 201 for the approved flight plan that restrict the flight of the UAV to the airspace corresponding to the waypoints, take-off and landing area, contingency flight paths, etc., specified in the flight plan.

At step 816, flight planning system 201 can send the flight data package to the UAV operator's device. For example, flight planning system 201 can send the flight data package to operator device 310. Operator device 310 can configure the UAV operator's UAV for flight using the information in the flight data package. For example, operator device 310 can send part (e.g., waypoints, geofence definitions, etc.) or all of the information in flight data package to the UAV to configure the UAV for flight.

Each of the processes, methods, and algorithms described in the preceding sections may be embodied in, and fully or partially automated by, code modules executed by one or more computer systems or computer processors comprising computer hardware. The code modules (or "engines") may be stored on any type of, one or more, non-transitory computer-readable media (e.g., a computer storage product) or computer storage devices, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as a compact discs, digital video discs, flash drives, or any other tangible media. Such software code may be stored, partially or fully, on a memory device of the executing computing device, such as airspace reservation module 302, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart-phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a toolbar, a pop up menu, interactive voice response system, or otherwise.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A flight planning system comprising:
   a memory; and
   a processor configured to execute instructions stored in the memory to:
      receive weather event data from an event service, the weather event data describing a weather event for a geospatial region, the weather event data including an event description, geospatial information, and time information;
      analyze the weather event data to determine property damage may be caused by the weather event for a particular geospatial area;
      automatically generate a flight plan for inspection of one or more structures located in the particular geospatial area, the flight plan including one or more waypoints defining a planned flight for an unmanned aerial vehicle (UAV) to inspect the one or more structures for damage caused by the weather event; and
      generate a flight data package for transmission to a ground control station or to the UAV, the flight data package comprising the flight plan.

2. The system of claim 1, wherein the processor is further configured to execute instructions stored in the memory to:
   generate a flight authorization request based on the automatically generated flight plan;
   transmit the flight authorization request to an approval system to reserve airspace corresponding to the automatically generated flight plan; and
   receive approval from the approval system for the flight authorization request.

3. The system of claim 1, wherein the processor is further configured to execute instructions stored in the memory to:
   store one or more previous flight authorization requests;
   determine whether the one or more previous flight authorization requests are associated with the particular geospatial region of the weather event;
   generate one or more new flight authorization requests based on the determined previous flight authorization requests, wherein the new flight authorization requests includes revised flight time information based on the weather event; and
   transmit the new flight authorization request to an approval system to reserve airspace; and
   receive approval from the approval system for the flight authorization request.

4. The system of claim 1, wherein the processor is further configured to execute instructions stored in the memory to:
   generate a flight authorization request based on the automatically generated flight plan;
   transmit the flight authorization request to an approval system to reserve airspace corresponding to the automatically generated flight plan;
   receive, from the approval system, information describing modifications to the flight plan; and update the flight plan based on the received modifications, wherein updating comprises parsing the received information and identifying aspects of the flight plan that have been modified.

5. The system of claim 1, wherein to analyze the weather event data comprises to:
determine whether the event data describes a hail storm, tornado, or flood that may cause property damage.

6. The system of claim 1, wherein the processor is further configured to execute instructions stored in the memory to:
determine a time period when the weather event is predicted to end; and
wherein the flight plan includes a time period for flight of a UAV, the time period for flight occurring after the weather event is predicted to end.

7. The system of claim 1, wherein the processor is further configured to execute instructions stored in the memory to:
transmit the flight data package to the ground control station, wherein the ground control station is configured to transmit at least a portion of the flight data package to the UAV.

8. The system of claim 1, wherein the processor is further configured to execute instructions stored in the memory to:
reserve airspace for the particular geospatial area, the airspace including allocated airspace blocks; and
wherein the flight data package further comprises information describing the allocated airspace blocks.

9. A method performed by one or more processors comprising the operations of:
receiving weather event data from an event service, the weather event data describing a weather event for a geospatial region, the weather event data including geospatial and time information;
analyzing the weather event data to determine possible property damage would be caused by the weather event for a particular geospatial area;
automatically generating a flight plan for inspection of one or more structures located in the particular geospatial area, the flight plan including one or more waypoints defining a planned flight for an unmanned aerial vehicle (UAV) to inspect the one or more structures for damage caused by the weather event; and
generating a flight data package for transmission to a ground control station or to the UAV, the flight data package comprising the flight plan.

10. The method of claim 9, further comprising the operations of:
generating a flight authorization request based on the automatically generated flight plan;
transmitting the flight authorization request to an approval system to reserve airspace corresponding to the automatically generated flight plan; and
receiving approval from the approval system for the flight authorization request.

11. The method of claim 9, further comprising the operations of:
storing one or more flight authorization requests for a geospatial area;
generating a new flight authorization request based on the one or more stored flight authorization requests, wherein the new flight authorization requests includes updated time information based on the weather event;
transmitting the flight authorization request to an approval system to reserve airspace corresponding to the automatically generated flight plan; and
receiving approval from the approval system for the flight authorization request.

12. The method of claim 9, further comprising the operations of:
generating a flight authorization request based on the automatically generated flight plan;
transmitting the flight authorization request to an approval system to reserve airspace corresponding to the automatically generated flight plan;
receiving, from the approval system, information describing modifications to the flight plan; and
updating the flight plan based on the received modifications, wherein updating comprises parsing the received information and identifying aspects of the flight plan that have been modified.

13. The method of claim 9, wherein analyzing the weather event data comprises:
determining whether the event data describes a hail storm, tornado, or flood that may cause property damage.

14. The method of claim 9, further comprising the operations of:
determining a time period when the weather event is predicted to end; and
wherein the flight plan includes a time period for flight of a UAV, the time period for flight occurring after the weather event is predicted to end.

15. The method of claim 9, further comprising the operations of:
transmitting the flight data package to the ground control station, wherein the ground control station is configured to transmit at least a portion of the flight data package to the UAV.

16. The method of claim 9, further comprising the operations of:
reserving airspace for the particular geospatial area, the airspace including allocated airspace blocks; and
wherein the flight data package further comprises information describing the allocated airspace blocks.

17. A method performed by one or more processors comprising the operations of:
receiving weather event data from an event service, the weather event data describing a weather event for a geospatial region, the weather event data including geospatial and time information;
analyzing the weather event data to determine possible property damage would be caused by the weather event for a particular geospatial area;
automatically generating a flight plan for inspection of one or more structures located in the particular geospatial area, the flight plan including one or more waypoints defining a planned flight for an unmanned aerial vehicle (UAV) to inspect the one or more structures for damage caused by the weather event; and
generating a flight data package for transmission to a ground control station or to the UAV, the flight data package comprising the flight plan.

18. The method of claim 17, further comprising the operations of:
generating a flight authorization request based on the automatically generated flight plan;
transmitting the flight authorization request to an approval system to reserve airspace corresponding to the automatically generated flight plan;
receiving approval from the approval system for the flight authorization request.

19. The method of claim 17, further comprising the operations of:
storing one or more flight authorization requests for a geospatial area;

generating a new flight authorization request based on the one or more stored flight authorization requests, wherein the new flight authorization requests includes updated time information based on the weather event;

transmitting the flight authorization request to an approval system to reserve airspace corresponding to the automatically generated flight plan; and receiving approval from the approval system for the flight authorization request.

20. The method of claim 17, further comprising the operations of:

generating a flight authorization request based on the automatically generated flight plan;

transmitting the flight authorization request to an approval system to reserve airspace corresponding to the automatically generated flight plan;

receiving, from the approval system, information describing modifications to the flight plan; and updating the flight plan based on the received modifications, wherein updating comprises parsing the received information and identifying aspects of the flight plan that have been modified.

21. The method of claim 17, wherein analyzing the weather event data comprises:

determining whether the event data describes a hail storm, tornado, or flood that may cause property damage.

22. The method of claim 17, further comprising the operations of:

determining a time period when the weather event is predicted to end; and wherein the flight plan includes a time period for flight of a UAV, the time period for flight occurring after the weather event is predicted to end.

23. The method of claim 17, further comprising the operations of:

transmitting the flight data package to the ground control station, wherein the ground control station is configured to transmit at least a portion of the flight data package to the UAV.

24. The method of claim 17, further comprising the operations of:

reserving airspace for the particular geospatial area, the airspace including allocated airspace blocks; and wherein the flight data package further comprises information describing the allocated airspace blocks.

25. An unmanned aerial vehicle (UAV) flight planning system comprising one or more processors configured to:

receive event data from an event service;

determine, based on the event data, a particular geographic area for which to reserve airspace in anticipation of UAV flight operations about the particular geographic area;

generate one or more airspace reservation requests for the particular geographic area;

transmit the one or more airspace reservation requests to an approval system to reserve airspace corresponding to the particular geographic area;

receive approval from the approval system for reservation of the airspace; and determine one or more flight plans for a UAV, wherein the flight plan includes one or more waypoints in the reserved airspace;

reserve airspace for the particular geographic area, the airspace including allocated airspace blocks; and generate a flight data package for transmission to a ground control station or to the UAV, the flight data package comprising at least the flight plan and information describing the allocated airspace blocks.

26. The system of claim 25, wherein the event data describes an event for a geospatial region, the weather event data including geospatial and time information.

27. The system of claim 25, wherein the airspace is defined as a volumetric area of airspace described by geospatial coordinates defining the boundaries of the airspace.

\* \* \* \* \*